(12) United States Patent
Ward

(10) Patent No.: US 8,448,995 B2
(45) Date of Patent: *May 28, 2013

(54) APPARATUS AND METHOD FOR SUPPORTING A PIPE COUPLING

(75) Inventor: Martin G. Ward, Lakewood, CO (US)

(73) Assignee: Onset Pipe Products, Inc., Lakewood, CO (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/425,641

(22) Filed: Apr. 17, 2009

(65) Prior Publication Data

US 2009/0261585 A1    Oct. 22, 2009

Related U.S. Application Data

(63) Continuation-in-part of application No. 12/105,074, filed on Apr. 17, 2008, now Pat. No. 7,770,941.

(51) Int. Cl.
*F16L 21/00* (2006.01)
(52) U.S. Cl.
USPC ............ 285/419; 285/45; 285/236; 29/455.1
(58) Field of Classification Search
USPC ................... 285/419, 45, 236, 237, 417, 371, 285/24; 29/455.1
See application file for complete search history.

(56) References Cited

U.S. PATENT DOCUMENTS

| | | |
|---|---|---|
| 232,432 A | 9/1880 | Allison |
| D32,498 S | 4/1900 | Watson |
| 2,068,648 A | 1/1937 | Kaplan |
| 2,288,904 A | 6/1942 | Hudson |
| 2,784,989 A | 3/1957 | Krupp |
| 2,904,356 A | 9/1959 | Love |
| 2,980,143 A | 4/1961 | Harris |
| 3,030,601 A | 4/1962 | Krebs |
| 3,153,550 A | 10/1964 | Hollett |
| 3,165,324 A | 1/1965 | Zopfi |
| 3,206,229 A | 9/1965 | Kramer |
| 3,211,475 A | 10/1965 | Freed et al. |
| 3,394,952 A | 7/1968 | Garrett |
| 3,479,066 A | 11/1969 | Gittleman |
| 3,527,484 A | 9/1970 | Walkden |
| 3,539,206 A | 11/1970 | Daniels et al. |

(Continued)

FOREIGN PATENT DOCUMENTS

EP                44719 A1    1/1982

OTHER PUBLICATIONS

Mission Rubber Company, "If we put our name on it—you can depend on It!" Product Catalog, Jun. 6, 24 pages.

(Continued)

*Primary Examiner* — David E Bochna
(74) *Attorney, Agent, or Firm* — Merchant & Gould, P.C.

(57) ABSTRACT

A pipe coupling support having a substantially rigid body with an inner surface formed to mate with at least a portion of the exterior surface of a pipe coupling installed on pipe. In many cases, the exterior surface of the installed pipe coupling will be non-cylindrical. For example, when pipes of differing diameters or pipes manufactured from different materials must be joined with commonly available pliable couplings. In this instance the inner surface of the body of the pipe coupling support may be formed to mate with a majority of or substantially the entire exterior surface of the installed pipe coupling.

14 Claims, 13 Drawing Sheets

U.S. PATENT DOCUMENTS

| | | | |
|---|---|---|---|
| 3,572,773 A | | 3/1971 | Read |
| 3,574,354 A | | 4/1971 | Mischel |
| 3,586,354 A | | 6/1971 | Boscacci |
| 3,692,337 A | | 9/1972 | Mischel |
| 3,743,329 A | | 7/1973 | Wesel |
| 3,837,685 A | | 9/1974 | Miller |
| 3,851,901 A | | 12/1974 | Sills |
| 4,036,513 A | | 7/1977 | Loftus et al. |
| 4,172,607 A | | 10/1979 | Norton |
| 4,186,948 A | | 2/1980 | Cronk |
| 4,221,407 A | | 9/1980 | Steimle |
| 4,282,743 A | | 8/1981 | Pickett |
| 4,336,959 A | | 6/1982 | Roche |
| 4,340,052 A | | 7/1982 | Dennehey et al. |
| 4,360,227 A | | 11/1982 | Bridges |
| 4,380,348 A | | 4/1983 | Swartz |
| 4,417,755 A | | 11/1983 | Gittleman |
| 4,480,860 A | | 11/1984 | Foresta et al. |
| 4,518,177 A | | 5/1985 | Deakins |
| 4,538,837 A | | 9/1985 | Cronk |
| 4,587,994 A | | 5/1986 | Links et al. |
| 4,611,835 A | | 9/1986 | Gittleman |
| 4,643,465 A | | 2/1987 | Green et al. |
| 4,667,505 A | | 5/1987 | Sharp |
| 4,726,611 A | | 2/1988 | Sauer |
| 4,728,130 A | * | 3/1988 | Corzine ......................... 285/318 |
| 4,741,559 A | | 5/1988 | Berghman |
| 4,763,695 A | | 8/1988 | Dooley |
| 4,804,209 A | | 2/1989 | Fischer |
| 4,875,711 A | * | 10/1989 | Watanabe ....................... 285/45 |
| 4,929,236 A | | 5/1990 | Sampson |
| 4,939,923 A | | 7/1990 | Sharp |
| D309,774 S | | 8/1990 | Lewis |
| 4,966,397 A | | 10/1990 | McKinnon |
| 5,002,314 A | * | 3/1991 | Smith .............................. 285/45 |
| D318,321 S | | 7/1991 | Wigle |
| 5,039,137 A | | 8/1991 | Cankovic et al. |
| 5,056,833 A | | 10/1991 | Webb |
| 5,070,597 A | | 12/1991 | Holt et al. |
| 5,190,322 A | | 3/1993 | Hughes |
| 5,193,859 A | | 3/1993 | McKinnon |
| 5,203,594 A | | 4/1993 | Straub |
| 5,370,427 A | | 12/1994 | Hoelle et al. |
| 5,398,976 A | | 3/1995 | Webb |
| 5,430,252 A | | 7/1995 | Petersen |
| 5,480,193 A | * | 1/1996 | Echols et al. .................... 285/45 |
| 5,531,695 A | | 7/1996 | Swisher |
| 5,564,463 A | | 10/1996 | Helmsderfer |
| D383,053 S | | 9/1997 | Shrader et al. |
| D383,378 S | | 9/1997 | Schrader et al. |
| 5,853,200 A | | 12/1998 | Zieres |
| 5,901,739 A | | 5/1999 | Helmsderfer |
| D439,637 S | | 3/2001 | Davies |
| D454,941 S | | 3/2002 | Dietzel |
| D468,002 S | | 12/2002 | Steffan |
| D473,935 S | | 4/2003 | Braun |
| 6,561,552 B1 | | 5/2003 | Berg |
| D486,891 S | | 2/2004 | Cronce, Jr. |
| 7,066,497 B2 | | 6/2006 | Fullbeck et al. |
| 7,249,787 B1 | | 7/2007 | Chisnell |
| 7,770,941 B2 | | 8/2010 | Ward |
| 7,887,097 B2 | * | 2/2011 | Blivet ............................. 285/45 |
| 2003/0184083 A1 | | 10/2003 | Linam et al. |
| 2004/0130148 A1 | | 7/2004 | Patterson et al. |
| 2005/0099005 A1 | | 5/2005 | Fullbeck et al. |
| 2005/0161941 A1 | | 7/2005 | Poll et al. |
| 2007/0222212 A1 | | 9/2007 | Chisnell |
| 2007/0257488 A1 | | 11/2007 | Jimenez |
| 2007/0284037 A1 | | 12/2007 | Buytaert |
| 2010/0270790 A1 | | 10/2010 | Ward |
| 2010/0320757 A1 | | 12/2010 | Ward |

OTHER PUBLICATIONS

International Search Report and Written Opinion for Application No. PCT/US2009/040837 dated Jun. 16, 2009.

U.S. Appl. No. 12/833,190, filed Jul. 9, 2010, Office Action mailed Sep. 24, 2010, 13 pages.

U.S. Appl. No. 12/833,190, filed Jul. 9, 2010, Final Office Action mailed Mar. 10, 2011, 11 pages.

IAPMO R&T, Product Listing Directory, http://pld.iapmo.org/, 1 page.

IAPMO Research and Testing, Inc., Certificate of Listing, Aug. 2009, 2 pages.

USPTO Notice of Allowance dated Apr. 1, 2010, cited in U.S. Appl. No. 12/105,074; 7 pages.

USPTO Non-Final Office Action dated Sep. 18, 2009, cited in U.S. Appl. No. 12/105,074; 12 pages.

Amendment and Response to Non-Final Office Action dated Sep. 18, 2009, cited in U.S. Appl. No. 12/105,074, filed Jan. 19, 2010; 11 pages.

USPTO Notice of Allowance dated Nov. 16, 2009, cited in U.S. Appl. No. 29/335,576; 9pgs.

Amendment and Response to Non-Final Office Action dated Sep. 24, 2010, cited in U.S. Appl. No. 12/833,190, filed Dec. 27, 2010; 13 pages.

U.S. Appl. No. 12/833,190, filed Jul. 9, 2010, Amendment and Response to non-final Office Action mailed Sep. 24, 2010, dated Dec. 27, 2010, 13 pages.

U.S. Appl. No. 12/833,190, filed Jul. 9, 2010, Amendment to Final Office Action mailed Mar. 10, 2011, dated Jun. 10, 2011, 11 pages.

U.S. Appl. No. 12/833,190, Amendment and Response filed Dec. 6, 2011, 10 pgs.

U.S. Appl. No. 12/833,190, Office Action mailed Jul. 6, 2011, 10 pgs.

U.S. Appl. No. 12/853,117, Office Action mailed Dec. 12, 2011, 8 pgs.

* cited by examiner

APPARATUS AND METHOD FOR SUPPORTING A PIPE COUPLING

RELATED APPLICATIONS

This application is a continuation-in-part of prior U.S. application Ser. No. 12/105,074, filed on Apr. 17, 2008, which application issued on Aug. 10, 2010, as U.S. Pat. No. 7,770,941, which is hereby incorporated by reference.

TECHNICAL FIELD

An apparatus and method for supporting or reinforcing a pipe coupling installed on pipe.

BACKGROUND

Pipe couplings are often used to couple or join the ends of two lengths of pipe together. Many modern pipe couplings are cylindrical or tubular devices formed of a pliable material such as natural or synthetic rubber. The free ends of the pipes to be coupled are fit into respective sides of the pipe coupling, and generally, one of many types of pipe or hose clamp is used to compress the coupling to the exterior surface of the pipes being joined. Pipe couplings thus serve at least two purposes. The coupling both joins the free ends of two or more pipes together and seals the joint against leakage.

The drain and waste system of most modem construction is fabricated from PVC or CPVC pipe having various suitable diameters. Generally, the interior drain and waste lines will be joined to one or more larger waste lines which passes from the interior to the exterior of the building.

In contrast to the interior drain and waste lines, exterior waste pipes and sewer lines are generally fabricated from clay, cast iron, formed concrete or other non-plastic materials. The pipes used in exterior waste lines often have a somewhat different outside diameter from the waste lines exiting a building. A special pipe coupling may be used to join together two pipes having differing outside diameters or fabricated from different materials.

Element 10 of FIG. 2 is a typical pipe coupling which may be installed between the waste pipe exiting a building and the feeder pipe to an external sewer line. Prior art couplings typically have a flexible or pliable body which is sized to receive the dissimilar pipes at opposite ends. In addition, one or more pipe clamps may be associated with the body to secure and seal the coupling to the respective pipes. Since a typical prior art coupling has a flexible or pliable body the pipe ends can move with respect to each other or separate from each other in response to tension or shear forces which are typically present when the ground around the pipes subsides, a building settles or other forces are applied to the system. Relatively small lateral displacement between the respective pipe ends can cause a failure of the seal and furthermore can cause a pipe edge to be projected into the flow pathway which facilitates blockage at the joint. The inability of a typical flexible coupling to adequately support the joint between waste and sewer pipes or to effectively resist shear and tension forces placed on the pipes is the primary cause of the failure of this joint. Accordingly, a commonplace but expensive repair which is often necessary on the joint between interior waste lines and the exterior sewer system involves excavation of the failed joint, repositioning of the pipes and replacement of the coupling.

Certain types of reinforced couplings are known which may reduce, but typically will not eliminate the problems described above. For example, couplings with a stainless steel support sleeve associated with the pipe clamps are available. Known reinforced designs do not, however, typically provide adequate support to resist the large shear and tension forces applied to pipes when a building or the ground around the joint settles.

Plumbing and sewage contractors may also encase the entire joint in a quantity of concrete. This effectively stabilizes the joint; however, this solution is expensive and renders the joint between the pipes no longer accessible for service needs.

The present invention is directed toward overcoming one or more of the problems discussed above.

SUMMARY OF THE EMBODIMENTS

One embodiment is a pipe coupling support having a substantially rigid body with an inner surface formed to mate with at least a portion of the exterior surface of a pipe coupling installed on pipe. In many cases, the exterior surface of the installed pipe coupling will be noncylindrical. For example, when pipes of differing diameters or pipes manufactured from different materials must be joined with commonly available pliable couplings. In this instance the inner surface of the body of the pipe coupling support may be formed to mate with a majority of or substantially the entire exterior surface of the installed pipe coupling.

The pipe coupling support may feature at least one recess in the body which is configured to receive a clamp or other structure associated with the installed pipe coupling. By effectively accommodating pipe clamp bolts or other structures in the recess, the pipe coupling support may otherwise more closely mate with the exterior surface of the installed pipe coupling. The support may also include apparatus for compressing or tightening the body into close engagement with the installed pipe coupling. This apparatus can include but is not limited to one or more pipe or hose clamps, bolts, screws, or other threaded members associated with the pipe coupling support body. The pipe coupling support may also include one or more inner supports associated with the inner surface of the body to closely mate with and further support the exterior surface of the installed pipe coupling or the pipe itself adjacent to the coupling.

Another embodiment is a pipe coupling having a substantially rigid body with an inner surface as described above. This embodiment may also include a support sleeve which is configured to fit between the rigid body and the exterior surface of a pipe coupling installed on pipe. In this embodiment, the support sleeve itself may define at least one recess configured to receive a clamp structure such as a tightening bolt associated with the installed pipe coupling. In installations where the exterior surface of the installed pipe coupling is non-cylindrical, the exterior surface of the support sleeve and a portion of the pipe coupling may define a substantially cylindrical surface when the support sleeve is operatively associated with the installed pipe coupling. The support sleeve may be rigid or pliable.

Another embodiment is a pipe coupling having a substantially rigid body and a pliable inner member. The pliable inner member may include a first cylindrical inner surface sized to mate with the outer surface of a first pipe having a first outside diameter. The pliable inner member may also have a second cylindrical inner surface sized to mate with the outer surface of a second pipe having a second outside diameter, which is less than the diameter of the first pipe. The pliable inner member may also have a junction surface between the first and second cylindrical surfaces which is substantially perpendicular to both the first and second cylindrical inner surfaces. This embodiment may also include apparatus such as one or more pipe clamps or bolts associated with the body for compressing or tightening the body and inner member into close engagement with the free ends of first and second pipes. When operatively installed the pipe coupling and inner member are configured such that the junction surface abuts the free end of the first pipe.

Another embodiment is a method of supporting a pipe coupling installed on pipe. The method includes providing a pipe coupling support of any type as described above and associating the pipe coupling support with an installed pipe coupling such that the inner surface of the support body is closely engaged with the exterior surface of the installed pipe coupling.

The method may also include compressing or tightening the pipe coupling support into close engagement with the installed pipe coupling. Compression may occur with pipe clamps, bolts associated with the body, or other tightening means. The method may also include receiving clamp structures such as bolts which are associated with the installed pipe coupling into recesses associated with the pipe coupling support to maximize the engagement area between the pipe coupling support and installed pipe coupling.

DETAILED DESCRIPTION

Figure 1:
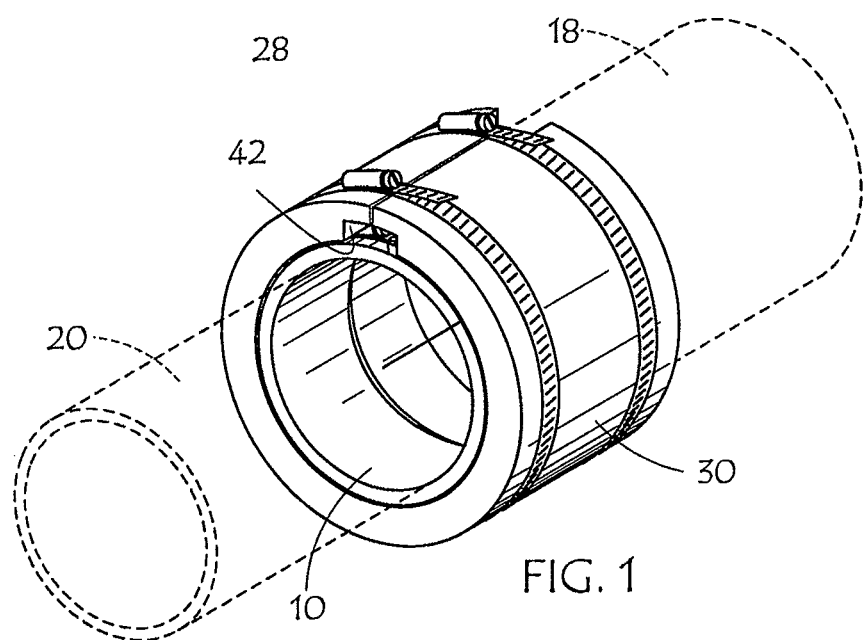
FIG. 1 is a perspective view of a pipe coupling support.
Figure 2:
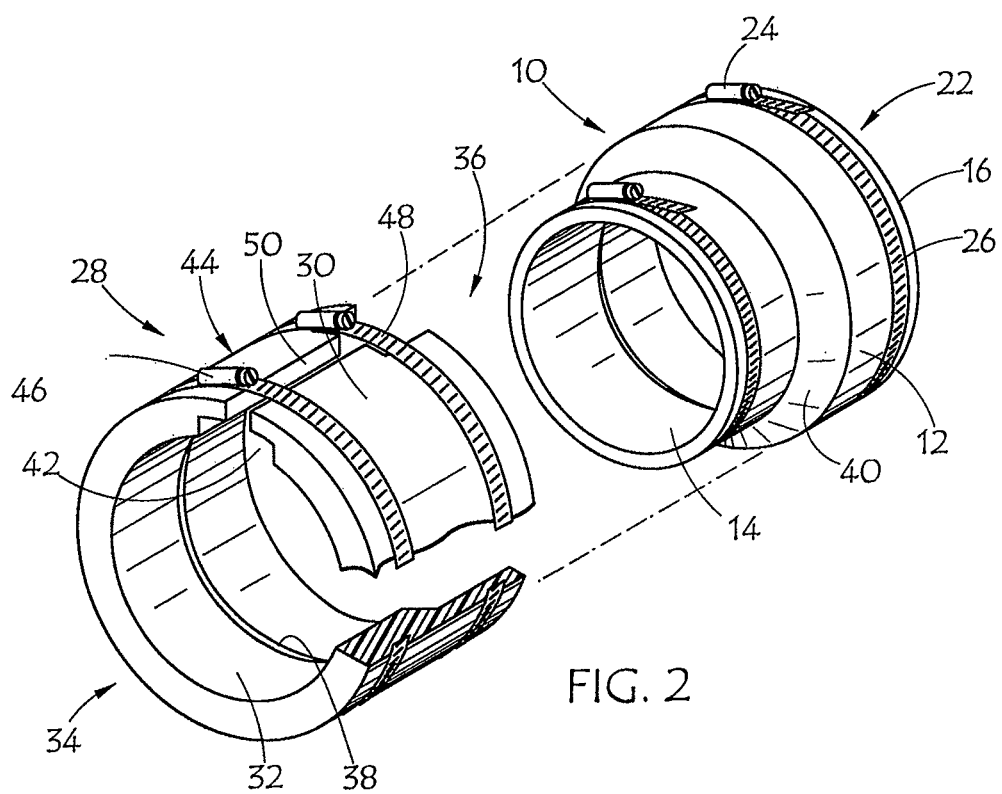
FIG. 2 is an exploded perspective view of the pipe coupling support of FIG. 1

Various embodiments of pipe coupling supports are disclosed herein which may be used to support and reinforce an existing, new or previously installed pipe coupling. A typical pipe coupling 10 is illustrated in FIG. 1 and FIG. 2. The pipe coupling 10 includes a sleeve 12 which is typically molded from a pliable substance such as natural or synthetic rubber. The sleeve 12 has a first opening 14 and a second opening 16 at opposite ends. The first and second openings are appropriately sized to receive the free ends of the pipes which are to be joined with the coupling 10. As is best shown in FIG. 2, the first opening 14 and second opening 16 may define openings of different diameter. Thus, the first opening 14 and second opening 16 may be formed to receive and seal with a first pipe 18 and second pipe 20 (see phantom outline FIG. 1) which have different diameters and may also be fabricated from different materials.

The pipe coupling 10 as described above is therefore suitable for joining and sealing the typically plastic pipe which passes to the exterior of a building from the building's drain and waste system with an exterior pipe connected to a sewer or septic system. The sewer or septic system pipe is often fabricated from a non-plastic material such as clay, cast iron or concrete.

The pipe coupling 10 also has one or more pipe clamps 22 associated with the sleeve 12. The pipe clamp 22 as shown in FIG. 2 includes a worm drive bolt 24 engaged with a typically stainless steel strap 26 such that rotation of the worm drive bolt 24 causes compression of the first or second opening 14, 16 respectively. Thus, the pipe clamp 22 may be used to assure that the coupling 10 is securely bound to and sealed with pipes 18 and 20.

The sleeve 12 is typically fabricated from a pliable material such as natural or synthetic rubber. Thus, the sleeve itself provides only moderate resistance to lateral displacement of the pipe ends as a result of shear forces which might result when the associated building or backfill settles. Similarly, the pliable sleeve 12 provides only moderate resistance to linear displacement of the free ends of the pipes 18 and 20 upon the application of tension forces such as might occur when backfill subsides along a length of pipe. Accordingly, the pipe coupling 10 provides only moderate protection against failure of the joint upon the application or force or stress to either pipe 18 or pipe 20.

One embodiment of a pipe coupling support 28 is illustrated in FIG. 1 and FIG. 2. This embodiment of a pipe coupling support 28 includes a substantially rigid body 30 which has an inner surface 32 which is formed to mate as closely as possible with the exterior surface of a pipe coupling 10 installed on pipe. The pipe coupling support body 30 may be fabricated from plastic, metal, concrete, a ceramic material or other substance having suitable rigidity to support an installed pipe coupling 10.

Many typical pipe couplings 10 have a non-cylindrical external profile since the sleeve 12 has a substantially uniform thickness throughout the coupling 10 but the first and second openings 14, 16 are of different sizes to accommodate dissimilar pipes. As shown in FIG. 2, the inner surface 32 of the rigid body 30 of a pipe coupling support 28 may be formed to mate with a majority of or substantially the entire exterior surface of the installed pipe coupling 10. Thus, the inner surface 32 may have a relatively smaller opening 34 and a relatively larger opening 36 at opposite ends of the body 30 to correspond with the differentially sized first and second openings 14, 16. In addition, the transition 38 between the smaller opening 34 and large opening 36 of the body 30 may be sloped at an appropriate angle or otherwise formed to closely mate with the sloped portion 40 of the sleeve 12 between the respective openings.

Close engagement of the pipe coupling support 28 with the coupling 10 may be further enhanced by providing the body 30 with one or more recesses 42 defined by the body 30 and positioned to receive protruding structures such as the worm drive 24 of the coupling 10. The operative configuration of a recess 42 receiving a worm drive 24 is best shown in FIG. 1.

As shown in FIG. 1 and FIG. 2, this embodiment of the pipe coupling support 28 may include an apparatus for compressing or tightening the body 30 into close engagement with the installed pipe coupling 10. This apparatus may (as is shown in FIGS. 1 and 2) be one or more conventional pipe clamps operatively associated with the substantially rigid body 30. The pipe clamps 44 may include a worm drive 46 and strap 48 such that tightening the bolt associated with the worm drive 46 causes the strap 48 to compress the body 30. Compression may occur at slot 50. Alternatively, another type of compression zone or a pliable portion may be added to the body 30 to facilitate radial compression.

Figure 3:
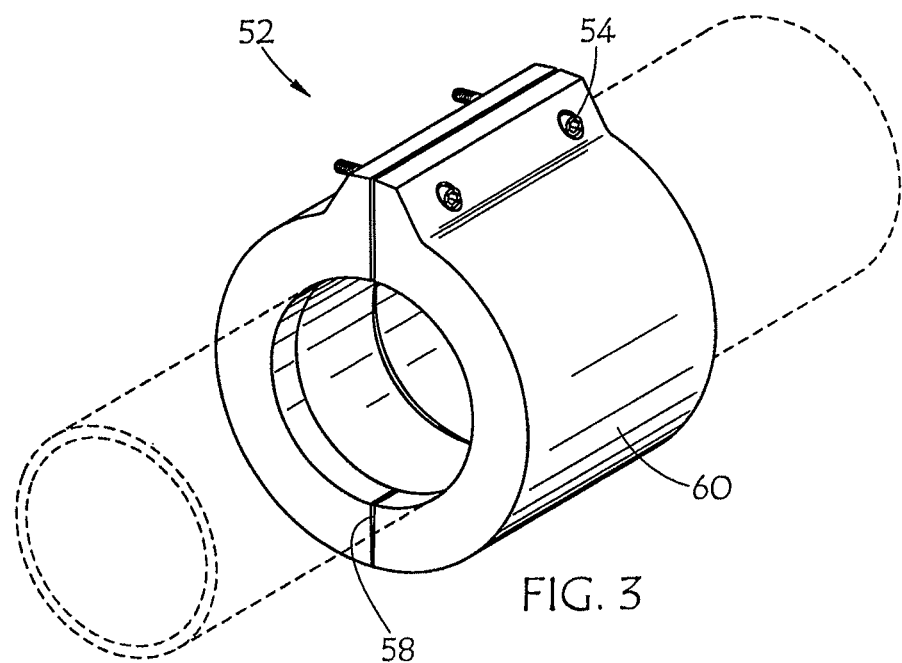
FIG. 3 is a perspective view of an alternative embodiment of a pipe coupling support.
Figure 4:
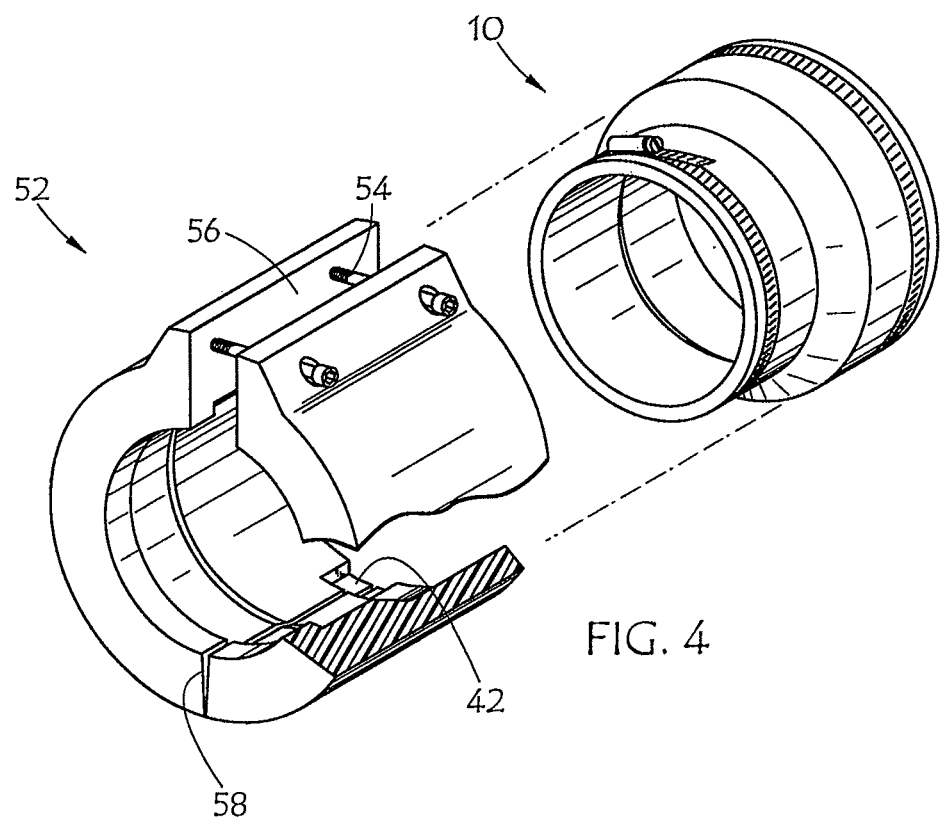
FIG. 4 is an exploded perspective view of the pipe coupling support of FIG. 3.

Other types of apparatus may be used to assure that the pipe coupling support may be compressed or tightened into close engagement with the installed pipe coupling 10. For example, as is illustrated in FIGS. 3 and 4 an alternatively configured pipe coupling support 52 which is otherwise structurally similar to the embodiment described above may be tightened into close engagement with an installed pipe coupling 10 with one or more threaded bolts 54 associated with a slot 56. The pipe coupling support 52 of FIGS. 3 and 4 also features a hinge 58 which may be a supplemental structure or living hinge molded into the body 60. The hinge facilitates the wide opening of the pipe coupling support 52 for placement over a pipe coupling 10.

Figure 5:
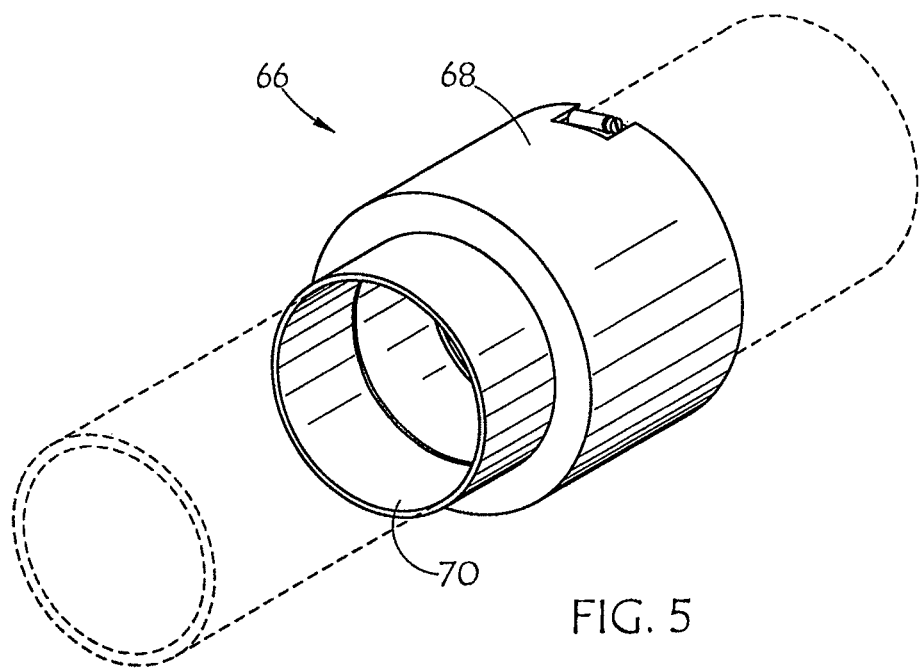
FIG. 5 is a perspective view of a pipe coupling support without compression apparatus.
Figure 6:
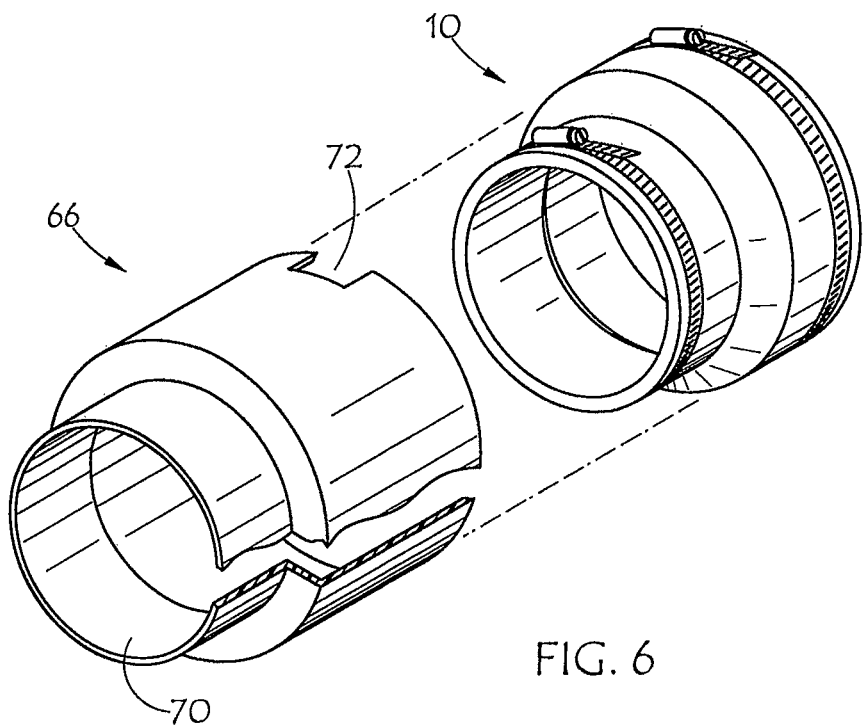
FIG. 6 is an exploded perspective view of the pipe coupling support of FIG. 5.

Separate apparatus for tightening the body 60 into close engagement with the installed pipe coupling 10 may not, in certain instances, be desired or necessary. For example, an alternative pipe coupling support 66 as illustrated in FIGS. 5 and 6 may include a body 68 which has an inner surface 70 and one or more recesses 72 configured to slide into close mating engagement with an installed pipe coupling 10.

Figure 7:
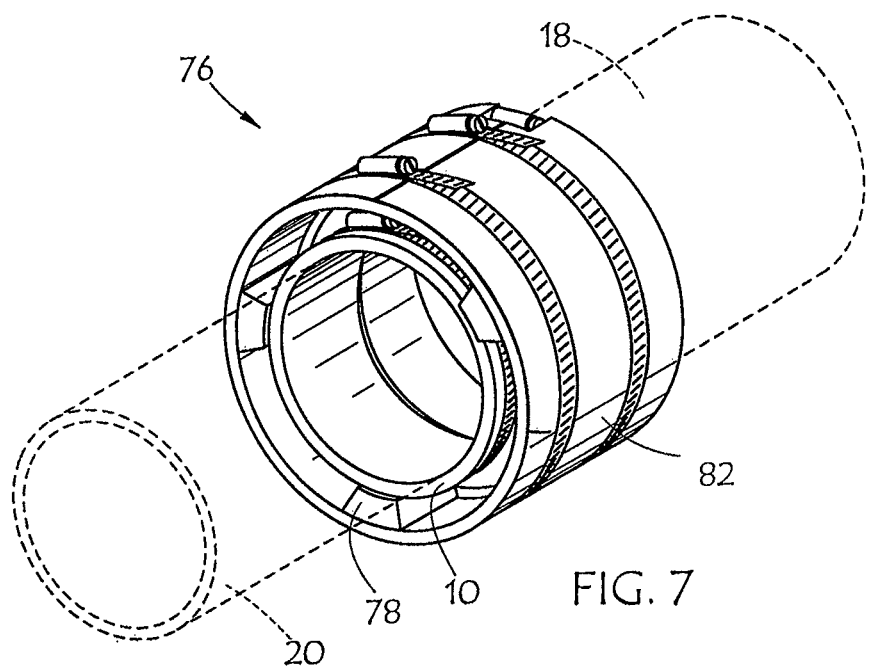
FIG. 7 is a perspective view of a pipe coupling support including inner supports.
Figure 8:
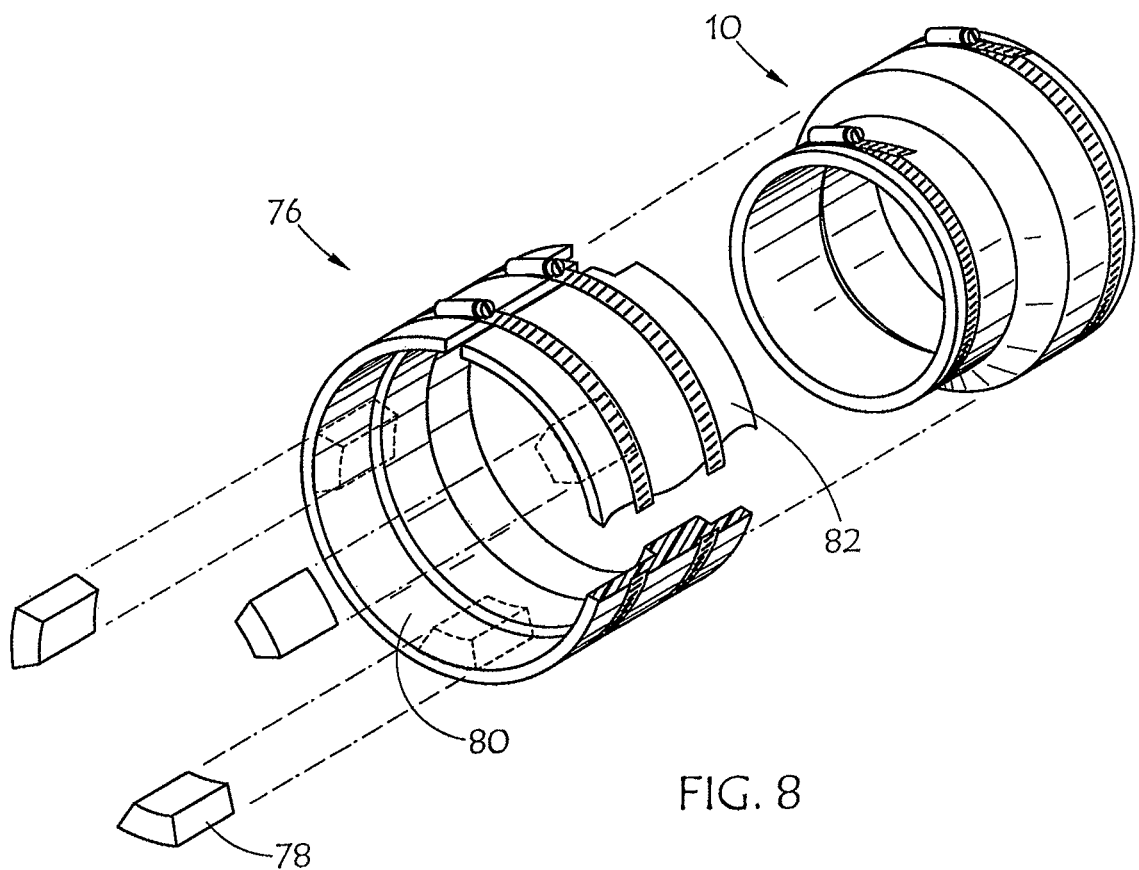
FIG. 8 is an exploded perspective view of the pipe coupling support of FIG. 7.

A pipe coupling support 76 as shown in FIGS. 7 and 8 may be fabricated with one or more inner supports 78 operatively positioned between the inner surface 80 of the body 82 and a portion of the exterior surface of an installed pipe coupling 10. Thus, the inner support 78 may provide additional support and minimize the need to fabricate a body with a variable inner profile. Alternatively, the body 82 of the pipe coupling support 76 could be sized to extend beyond the ends of the pipe coupling 10 and one or several inner supports 78 could mate and support directly with a first or second pipe 18,20. The inner supports 78 can be of any shape and fabricated from a pliable or rigid material. The inner supports 78 may be separate structures or formed as extensions of the body 82.

Figure 9:
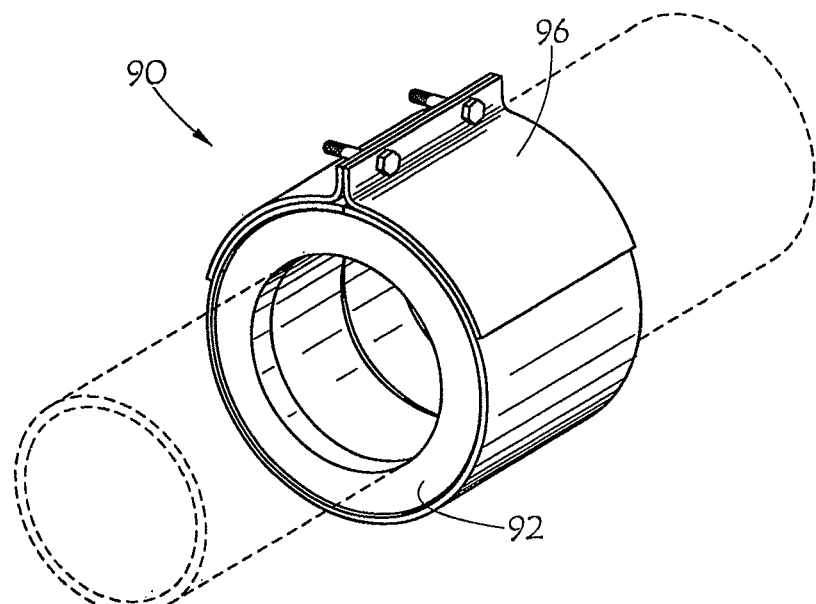
FIG. 9 is a perspective view of a pipe coupling support including a support sleeve.
Figure 10:
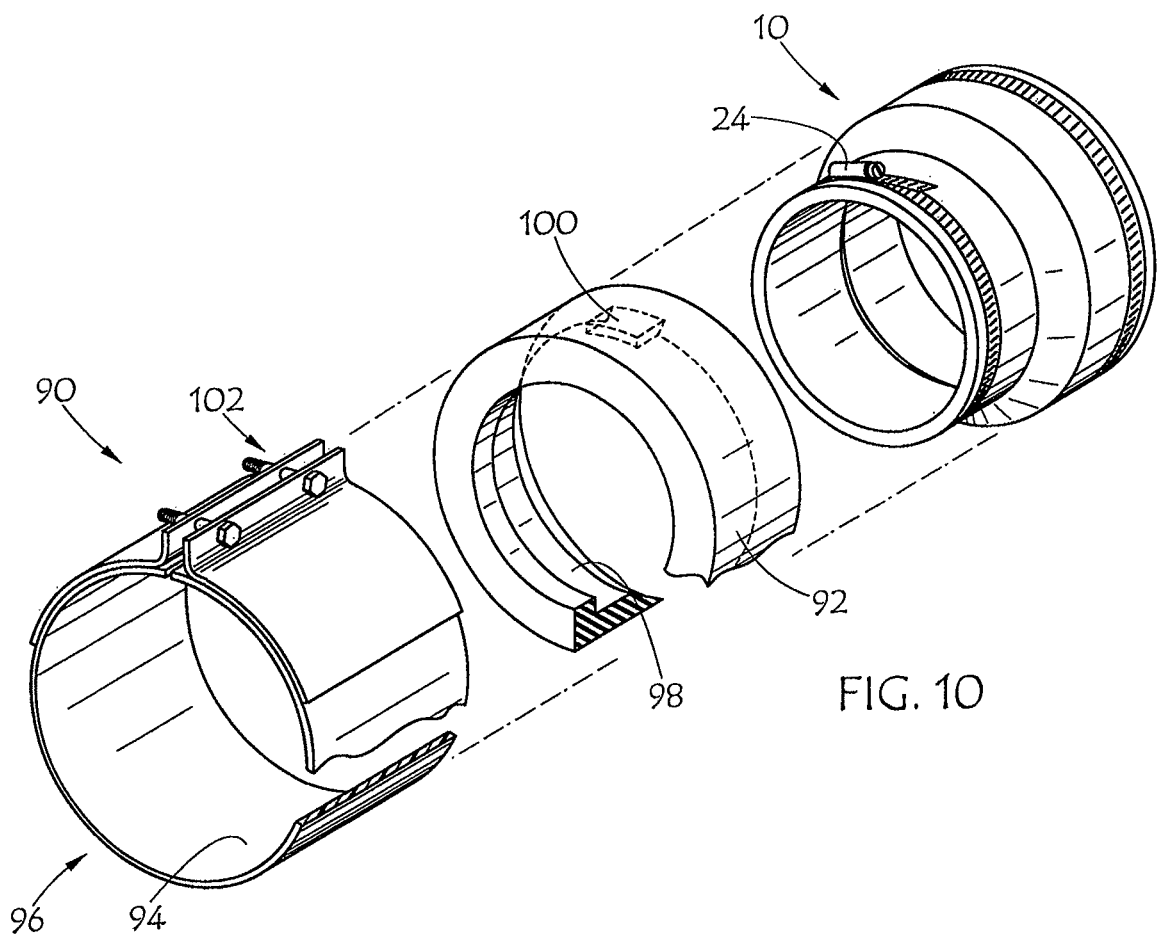
FIG. 10 is an exploded perspective view of the pipe coupling support of FIG. 9.

In each of the embodiments described above, the substantially rigid body of the pipe coupling support either directly, or in association with inner supports, is closely engaged with the pipe coupling 10 when the pipe coupling support is positioned for use. In an embodiment of a pipe coupling support 90 as shown in FIGS. 9 and 10 a support sleeve 92 may be operatively positioned between an inner surface 94 of the substantially rigid body 96 and an installed pipe coupling 10. The support sleeve 92 may have an inner support surface 98 which is formed to mate with an exterior surface of the pipe coupling 10. The support sleeve may also define one or more recesses 100 configured to receive worm drive 24 or other structure associated with the pipe coupling 10.

The body 96 of this embodiment of the pipe coupling support 90 may include an apparatus for compressing or tightening the body and support sleeve into close engagement with the pipe coupling 10. This apparatus may be a pipe clamp as described above, a bolt and slot apparatus 102 as shown on FIGS. 9 and 10, or another apparatus suitable for radially compressing the body 96.

As described above, a typical pipe coupling 10 for joining dissimilar pipes will not have a straight walled cylindrical external profile. Accordingly, many embodiments of a pipe coupling support as described herein feature an inner surface specifically formed to mate with the irregular exterior surface of the pipe coupling. As shown in FIGS. 9 and 10, the support sleeve 92 may be sized such that the exterior surface of the support sleeve and a portion of the exterior surface of the installed pipe coupling 10 form a substantially straight walled cylindrical combined surface when the support sleeve 92 is operatively associated with the installed pipe coupling. Thus, the inner surface of the body 96 may be fabricated with substantially straight cylindrical sides. This configuration facilitates fabrication of the body 96 from rolled sheet stock or readily available rigid pipe sections and in certain instances may eliminate molding or machining steps which might be necessary with other embodiments to ensure that the inner surface of the body closely mates with the exterior surface of a pipe coupling.

Figure 11:
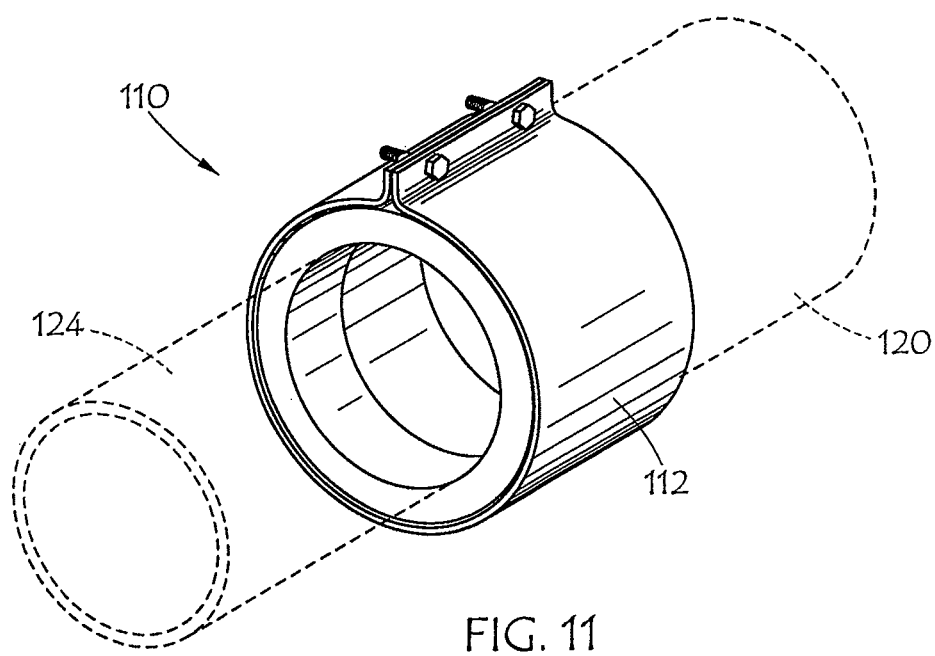
FIG. 11 is a perspective view of a pipe coupling having a pliable inner member with a junction surface.
Figure 12:
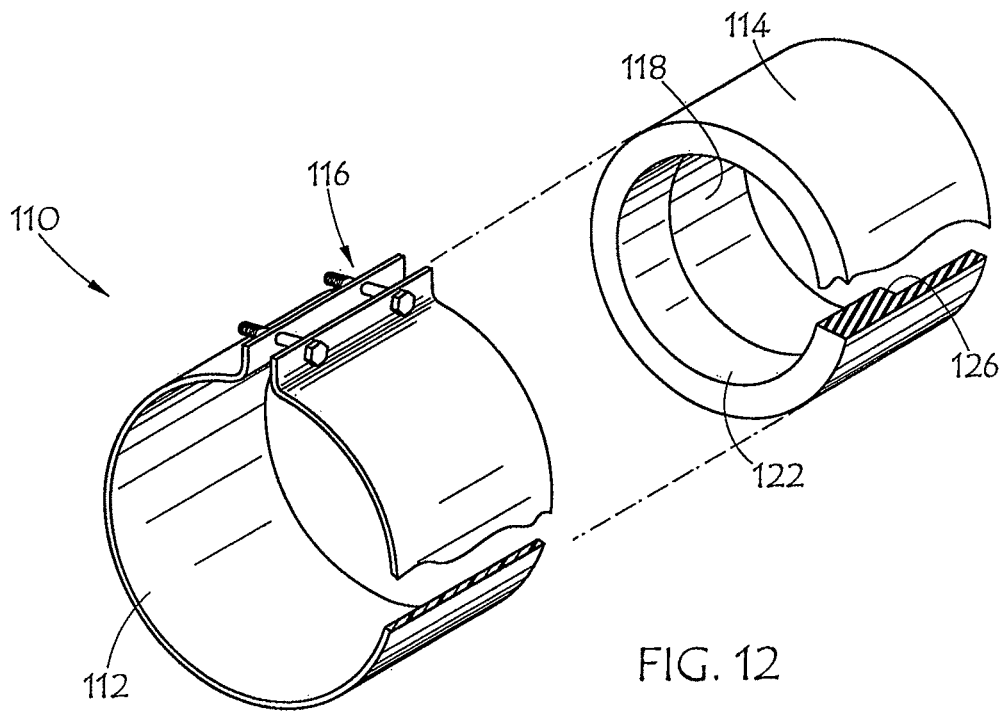
FIG. 12 is an exploded perspective view of the pipe coupling of FIG. 11.

FIGS. 11 and 12 illustrate a novel pipe coupling 110. The pipe coupling 110 includes a substantially rigid body 112 and a pliable inner member 114. The body 112 may optionally include compression apparatus such as one or more pipe clamps or the bolt, slot and flange apparatus 116 illustrated in FIGS. 11 and 12. The coupling 110 could alternatively be implemented with other types of compression apparatus or no compression apparatus at all.

The pliable inner member 114 includes a first cylindrical inner surface 118 sized to mate with the outer surface of a first pipe 120 having a first diameter. The pliable inner member 114 also has a second cylindrical inner surface 122 sized to mate with an outer surface of a second pipe 124 having a second diameter which is less than the diameter of the first pipe 120.

A junction surface 126 is the transition between the first cylindrical inner surface 118 and the second cylindrical inner surface 122. The junction surface 126 is substantially perpendicular to both the first and second cylindrical inner surfaces. Thus, when the coupling 110 is placed into engagement with a free end of the first pipe 120 the free end closely abuts the junction surface assuming the free end of the first pipe 120 is cut in a reasonably square manner.

Figure 13:
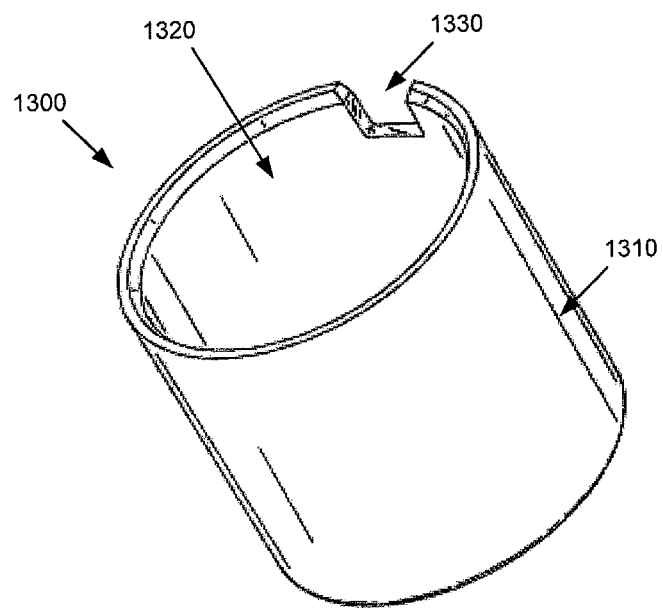
FIG. 13 is a top perspective view of an embodiment of a pipe coupling support.

FIG. 13 is a top perspective view of an embodiment of a pipe coupling support 1300. In embodiments, the U-shaped pipe coupling support includes a rigid body 1310 and a first opening 1320 with a recess 1330. In embodiments, the rigid body 1310 may be made out of a rigid material such as, for example, PVC pipe; however, because the purpose of the coupler 1300 is to provide additional support to pipe couplings, which are often made of pliable materials such as rubber, the pipe coupling support 1310 may be made of other material so long as the material provides enough rigidity to support an installed pipe coupling. In embodiments, the rigid body 1310 of the pipe coupling support 1300 is cylindrical in shape, thereby providing a uniform external diameter to the pipe coupling support 1300 even though the installed pipe coupling supported by the pipe coupling support 1300 may not have a uniform external diameter.

Figure 22:
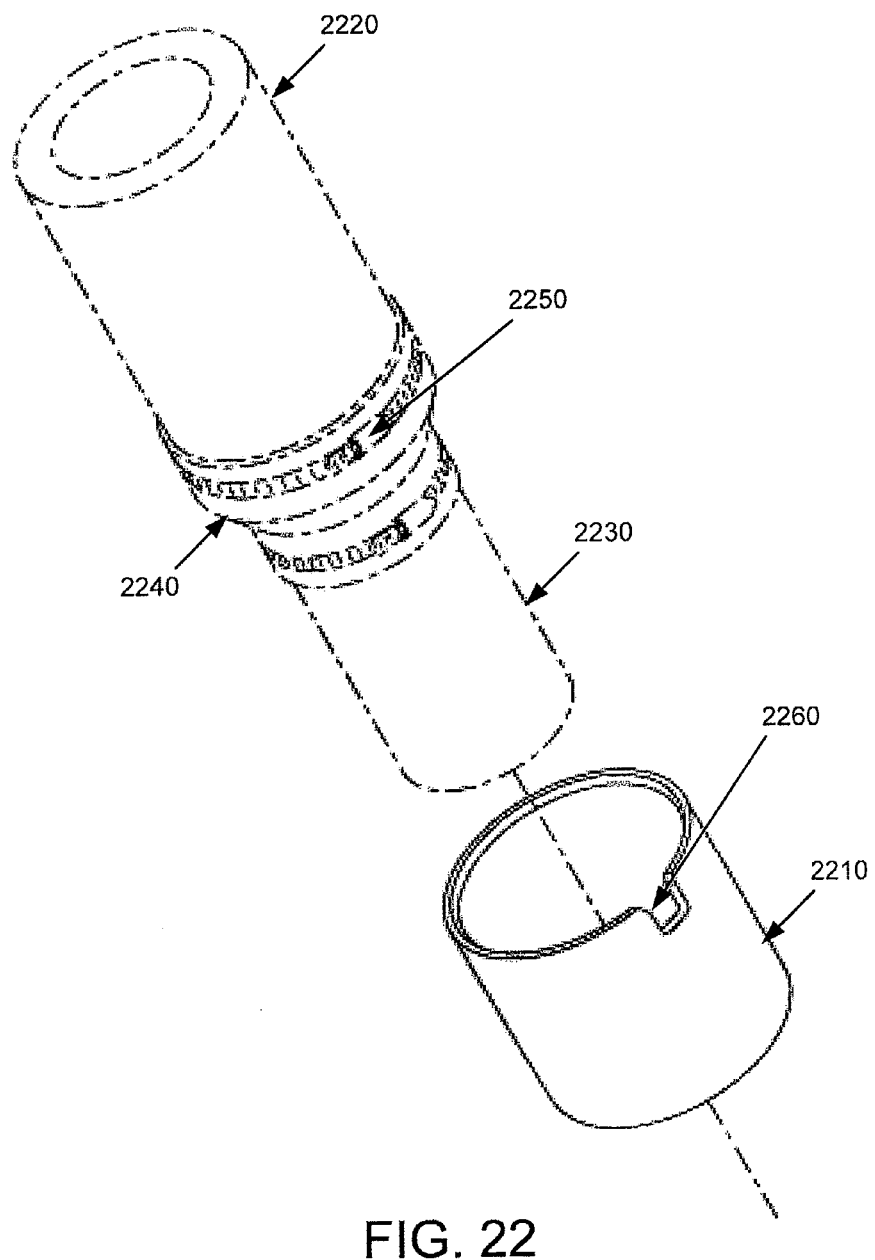
FIG. 22 is an exploded view of an embodiment of a pipe coupling support prior to installment on a pipe coupler assembly.
Figure 23:
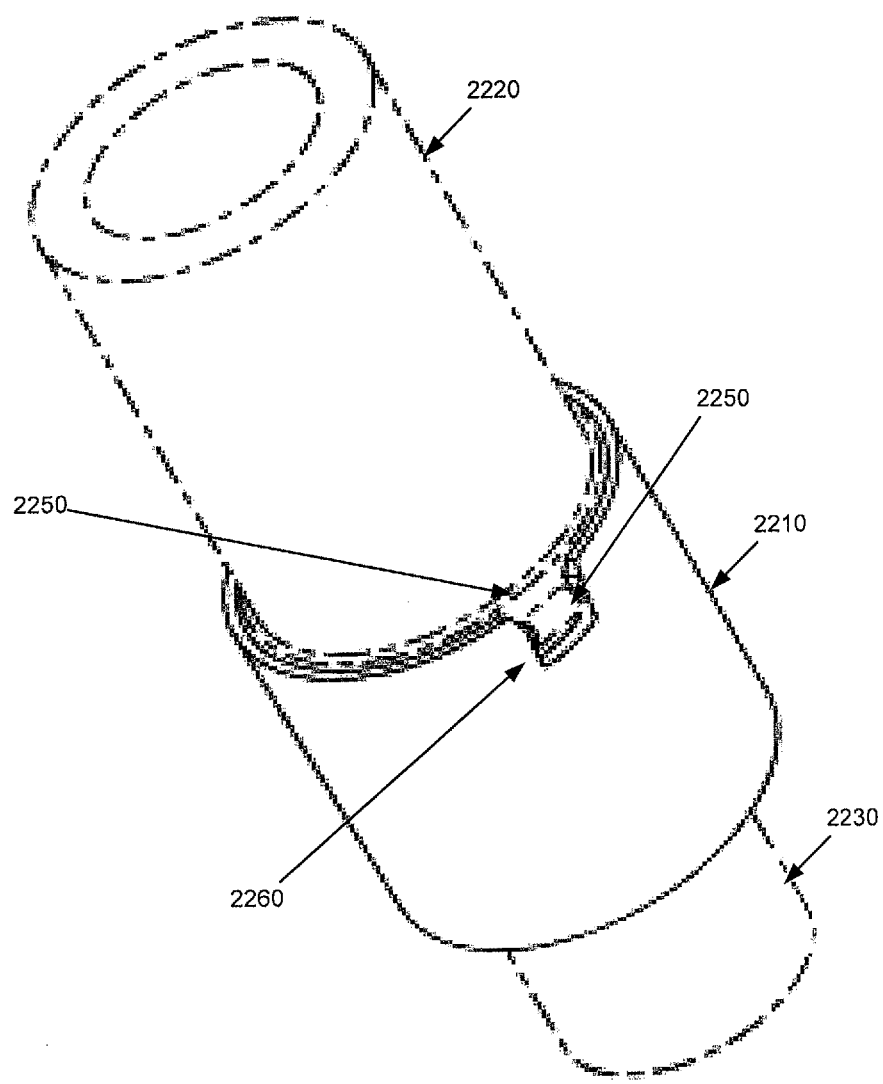
FIG. 23 illustrates an embodiment of a pipe coupling support installed on a pipe coupler assembly.

In embodiments, the first opening 1320 is sized accordingly such that it provides an interior diameter in the top end of the pipe coupling support 1300 that can fit around an installed pipe coupling, as displayed in FIGS. 1, 22, and 23. In embodiments, a pipe coupling is installed to connect two pipes having different external diameters, e.g., a clay sewage pipe and a PVC sewage pipe. In such embodiments, the first opening 1320 must be sized such that it opens up an interior diameter that is large enough to accommodate the size of the larger external diameter of the two pipes plus the diameter of the installed pipe coupler that is fit over the connected pipes. For example, in the case of connecting a clay sewage pipe and a PVC sewer pipe, the first opening must be large enough to fit around the clay sewage pipe and the installed pipe coupler, which surrounds the clay sewer pipe. In embodiments, the first opening may be beveled, to aid in fitting the pipe coupling support 1300 over the installed pipe coupler.

In embodiments, the rigid body 1310 may have a recess 1330. The recess 1330 provides for fitting the pipe coupling support over an installed pipe coupling that is attached to the pipe by some attachment mechanism, such as the hose clamp worm drive 24 of pipe coupling 10 illustrated in FIG. 2. The recess 1330 may be a notch in the body 1310 that leaves the attachment mechanism exposed as shown or the recess 1330 may be incorporated into a housing (not shown) so that the attachment mechanism is covered when the assembly is viewed from the side. The recess may further be sized specifically for the attachment mechanism so as to prevent the mechanism from operating (detaching) when the support 1300 is installed. For example, in an embodiment the recess is sized to be slightly larger than the worm drive of a hose clamp thus preventing the screw of the worm drive from unscrewing out of the worm drive. The recess 1330 of opening 1320 provides that the pipe coupling support 1300 can be correctly fitted over an installed pipe coupling such that installed pipe coupling lies entirely within the rigid body 1310 of pipe coupling support 1300, that is, it encloses and covers substantially all of the coupling. This provides better support for and protection of the installed pipe coupling.

Figure 14:
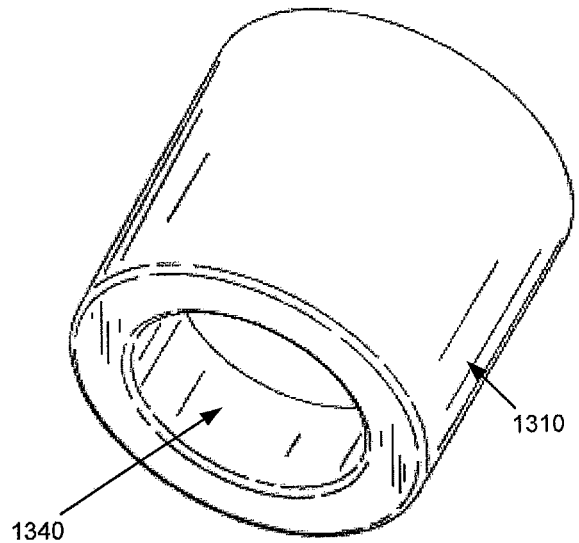
FIG. 14 is a bottom perspective of an embodiment of a pipe coupling support.

FIG. 14 is a bottom perspective of an embodiment of a pipe coupling support 1300. Pipe coupling support 1300 includes a second opening 1340 opposite the first opening 1320 (FIG. 13). The second opening is sized to form a different interior diameter at the bottom of the pipe coupling support 1300. In embodiments, the second opening 1340 may provide a smaller interior diameter than the first opening 1320. For example, again referring to the situation in which pipe coupling is installed to connect two pipes having different external diameters, the second opening 1340 may be sized to fit securely over the pipe with a smaller external diameter, e.g., a PVC sewage pipe. By providing two openings with different diameters opposite one another, pipe coupler 1300 is capable of securely fitting over coupled pipes having two different exterior diameters as well as the installed pipe coupler. The secure fitting over each end provides extra support to the installed pipe coupling and aids in keeping the pipe coupler support 1300 in place without necessarily having to use a compression apparatus or other securing means, such as, but not limited to glue, epoxies, sleeves, etc. However, in embodiments, a compression apparatus or other securing means may be employed to help secure pipe coupler 1300 over the installed pipe coupling.

Figure 15:
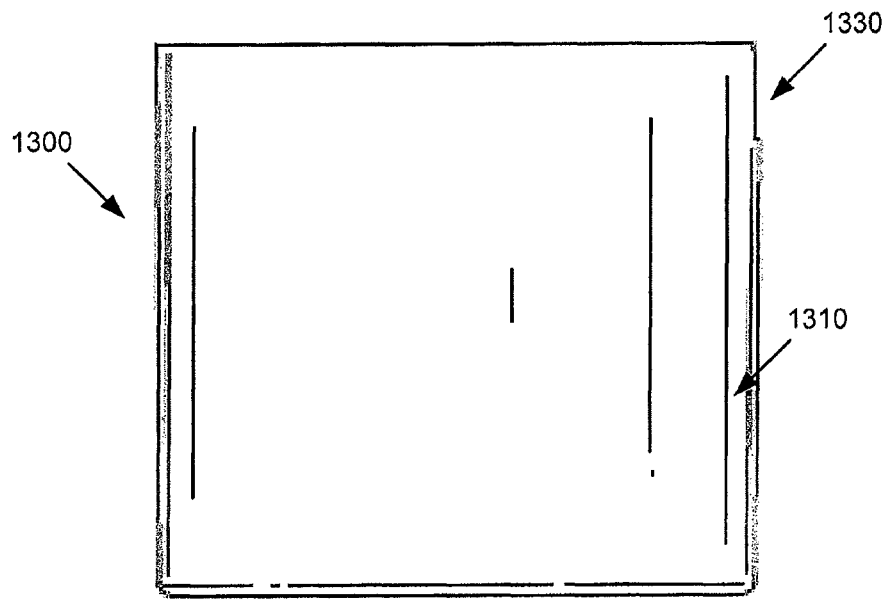
FIG. 15 is a front view of an embodiment of a pipe coupling support.
Figure 16:
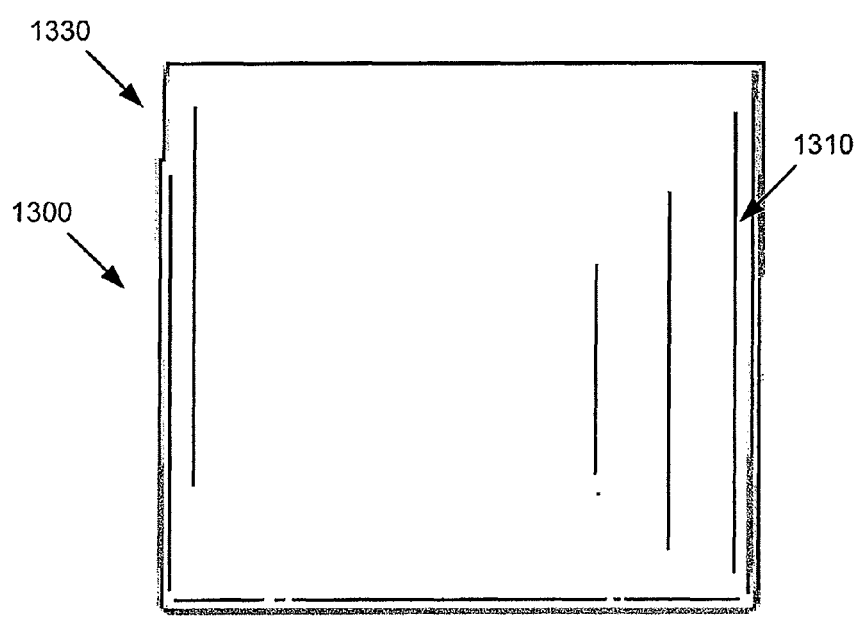
FIG. 16, is a back view of an embodiment of a pipe coupling support.

FIG. 15 is a front view of an embodiment of the pipe coupling support 1300 and FIG. 16, is a back view of an embodiment of the pipe coupling support 1300. As illustrated in FIGS. 15 and 16, the pipe coupling support 1300 provides a uniform, cylindrical surface.

Figure 17:
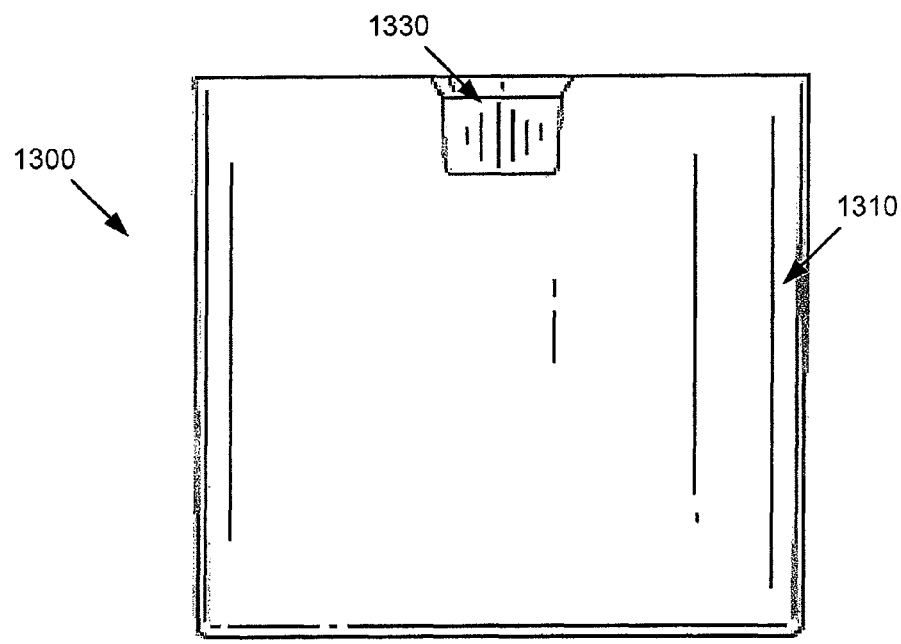
FIG. 17 is a right side view of an embodiment of a pipe coupling support.
Figure 18:
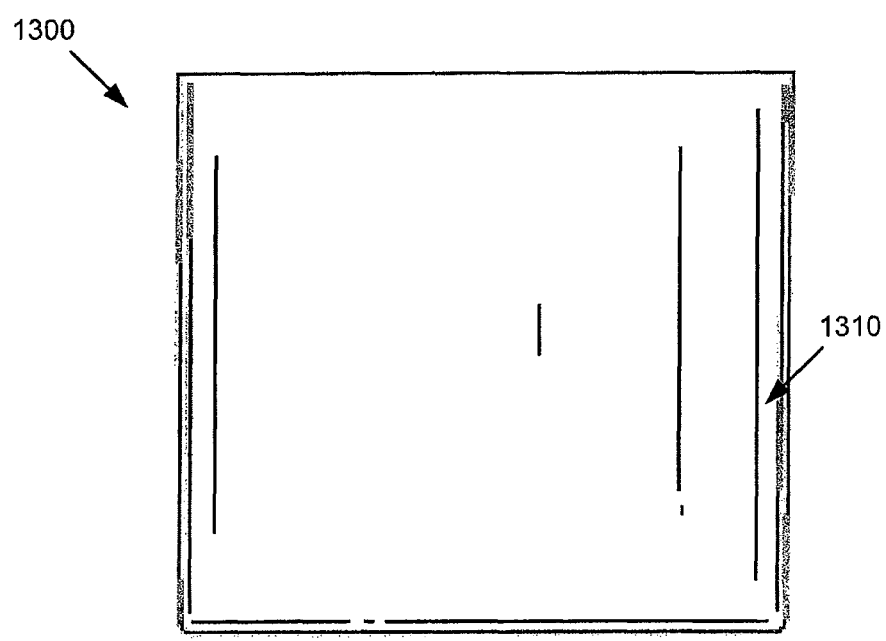
FIG. 18 is a left side view of an embodiment of a pipe coupling support.

FIG. 17 is a right side view of an embodiment of the pipe coupling support 1300 and FIG. 18 is a left side view of an embodiment of the pipe coupling support 1300. As illustrated in FIG. 17, the pipe coupling support 1300 contains a recess 1300 in one opening of the rigid body 1310. Because, in embodiments, the rigid body 1310 is uniformly cylindrical, the pipe coupling support 1300 can be positioned accordingly to fit over a worm drive of an installed pipe coupling. Although not illustrated in the particular embodiment displayed in FIGS. 17 and 18, multiple recesses may be included in the rigid body 1310 for any additional protruding elements such as multiple worm drives or attachment elements. In further embodiments, pipe coupler 1300 may include one or more recesses on each end of the rigid body 1310.

Figure 19:
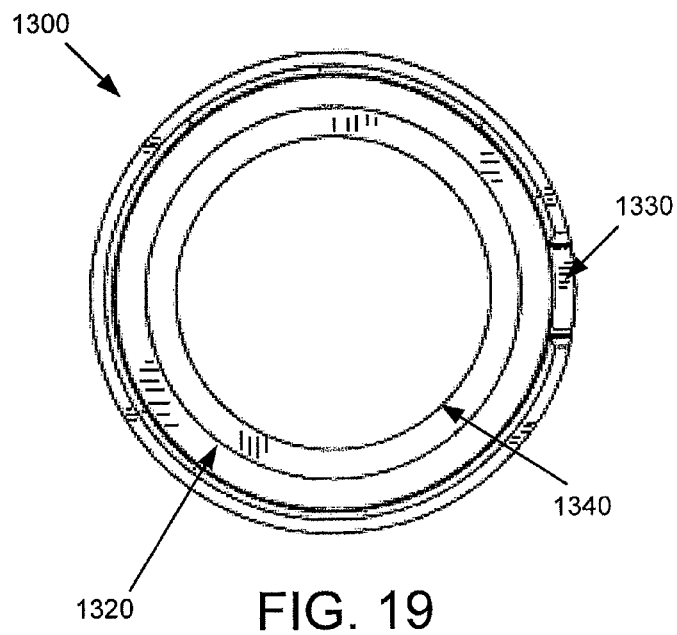
FIG. 19 is a top view of an embodiment of a pipe coupling support.

FIG. 19 is a top view of an embodiment of a pipe coupling support 1300. As displayed in FIG. 19, the first opening 1320 in the rigid body 1310 is at the top of the pipe coupling support 1300. In embodiments, the first opening 1320 is sized such that it has a larger diameter than the second opening 1340 at the bottom of the pipe coupler 1300. This provides the ability to support installed pipe couplings that connect pipes having different external diameters.

In embodiments, the rigid body 1310 of the pipe coupling support 1300 is molded such that the interior diameter of the rigid body 1310 accommodates the size of the first opening 1320 and the second opening 1340. For example, as illustrated in FIG. 19, the second rigid body is molded such that the interior folds in upon itself in a U-shape cross-section to produce the smaller diameter of the second opening. In other embodiments, the rigid body 1310 may be tapered and vary in thickness in order to accommodate the different sizes of the first opening 1320 and the second opening 1340.

Figure 20:
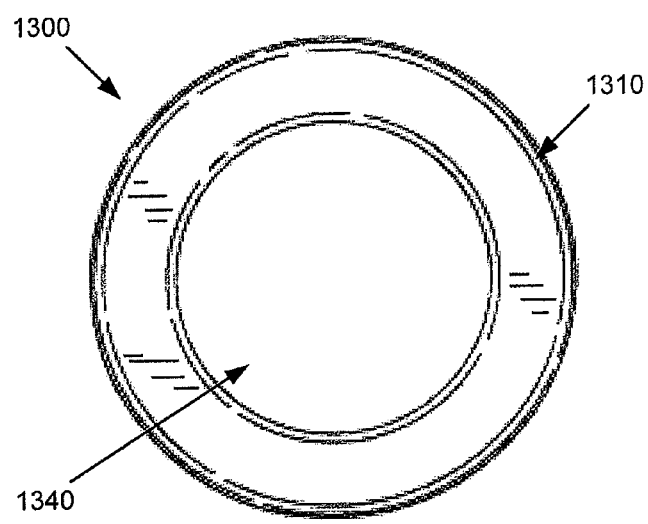
FIG. 20 is a bottom view of an embodiment of a pipe coupling support.

FIG. 20 is a bottom view of an embodiment of a pipe coupling support 1300. In embodiments, the bottom end of the pipe coupling support 1300 has a second opening with a smaller diameter. The rigid body 1310 of the pipe coupling support may be formed such that it folds in on itself to produce a smaller diameter for the second opening 1320. In other embodiments, the rigid body 1310 may be thicker at the bottom in order to produce a smaller diameter for the second opening 1320.

Figure 21:
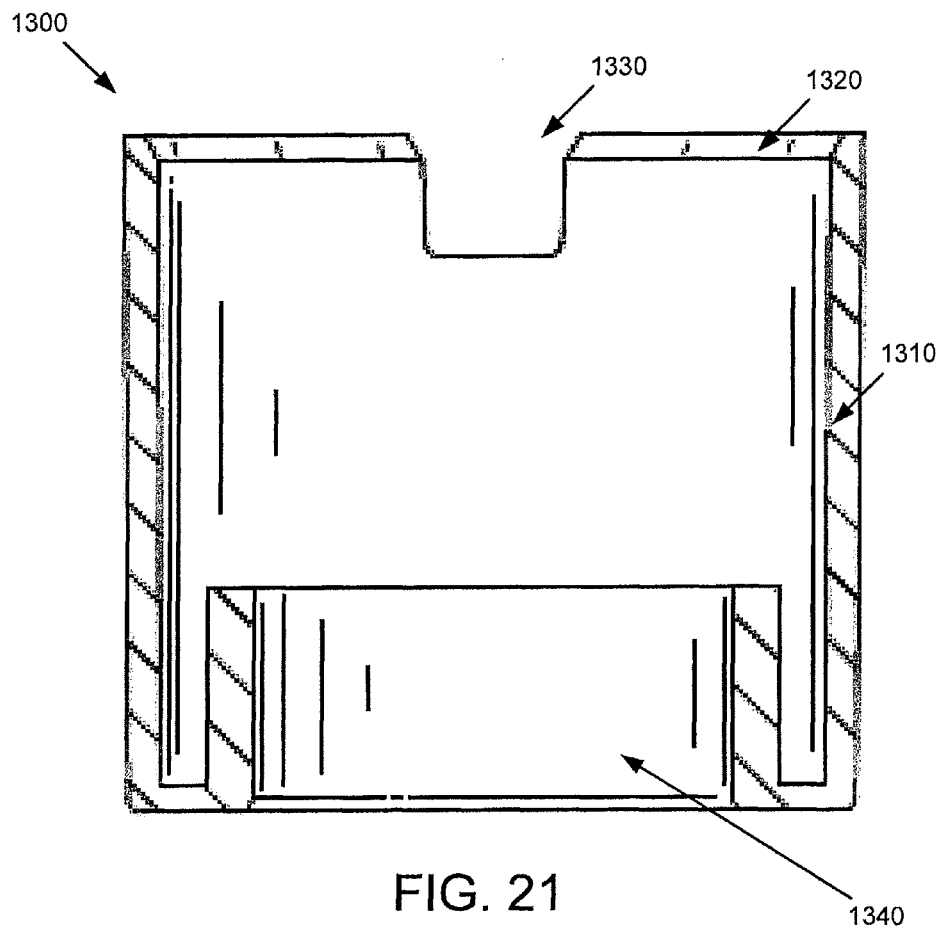
FIG. 21 is a cross section view of an embodiment of a pipe coupling support.

FIG. 21 is a cross section view of an embodiment of a pipe coupling support 1300. As discussed, pipe coupling support 1300 may have two different openings opposite each other. The top end of pipe coupling support 1300 has a first opening 1320 that has a first diameter. The bottom end of the pipe coupling support 1300 has a second opening that has a second diameter. The first and second diameters may be sized according to the types of pipes supported by the pipe coupler support 1300. As illustrated in FIG. 20, in embodiments the rigid body 1310 of the pipe coupling support may be formed in a U-shape to accommodate the smaller diameter of the second opening. In other embodiments, the interior of the rigid body 1310 may be tapered between the two openings such that the rigid body 1310 is thicker at the bottom thereby resulting in a smaller opening. In further embodiments, the first opening 1320 and the second opening 1340 may be concentric, thereby aligning the centers of the first pipe and the second pipe when the pipe coupling support is installed over the pipe coupling.

FIG. 22 is an exploded view of an embodiment of a pipe coupling support 2210 prior to installment on a pipe coupler assembly. In embodiments, a first pipe 2220 is connected to a second pipe 2230 by a coupler 2240. In embodiments, the first pipe 2220 has a different external diameter than the second pipe 2230. Pipe coupler 2240 is shaped such that one end of the pipe coupler 2240 fits over the external diameter of the first pipe 2220 and the opposite end of the pipe coupler 2240 fits over the external diameter 2230. Generally, the pipe coupler 2440 is made of pliable material which may provide inadequate support to ensure that the coupling of the first pipe 2220 and the second pipe 2230 does not flex or break when exposed to certain forces, e.g., shearing forces and other forces that pipe couplers are subjected to. In embodiments, the installed pipe coupler may have a protruding structure, such as, but not limited to a compression apparatus. The pipe coupler 2240 may be secured over the first and second pipes using a compression apparatus 2250. In embodiments, the compression apparatus may be a hose clamp or any other type of compression apparatus known to the art. In further embodiments, the compression apparatus may have a protruding tightening or locking mechanism, such as a worm drive bolt.

The various pipe coupling supports disclosed herein may be fitted over the installed pipe coupling 2240 to provide additional support to the coupling. In embodiments, a pipe coupling support 2210 may be fitted over the second pipe 2230, the pipe coupling 2240, and the first pipe 2220. In embodiments, the pipe coupler support 2210 may have two different sized openings sized such that the one opening fits flush (e.g., provides a clearance fit) against the second pipe 2230 and the opposite opening fits flush against the portion of the pipe coupler 2240 that covers and is attached to the first pipe 2220. In additional embodiments, the pipe coupler may have a recess 2260 in one of its opening to accommodate the protruding tightening or locking mechanisms of a compression apparatus 2250 securing the pipe coupling 2240 to the larger pipe 2220. As illustrated in FIG. 23, this allows the pipe coupler support 2210 to fit over the second pipe 2230, the second pipe 2220, and the pipe coupler 2240 such that the substantially all of the pipe coupler 2240 lies within the pipe coupler support 2210. The recess 2260 allows the protruding structure of the compression apparatus 2250 to slide into the pipe coupling support 2210.

The pipe coupling support embodiments of FIGS. 1-23 described in detail above may be used to provide support and structural rigidity to a new or previously installed pipe coupling. The pipe coupling support may be placed or slid over the existing pipe coupling while making sure that protruding apparatus associated with the coupling such as the worm drive 24 of FIG. 2 are received in the appropriate recesses 42 associated with the pipe coupling support. When properly placed into position, any compression apparatus associated with the pipe coupling support may be tightened assuring close operative engagement between the pipe coupling support and the underlying pipe coupling.

The pipe coupling support may be installed over a pipe coupling immediately after the pipe coupling is installed to join pipe sections. Alternatively, a pipe coupling support may be installed over an existing pipe coupling to repair or reinforce the joint. The substantially rigid body of the various pipe coupling support embodiments described herein greatly increases the ability of a pipe joint joined with a conventional pipe coupling to resist shear forces or tension forces as are commonly encountered when settling occurs.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

The description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiment described and shown in the figures was chosen and described in order to best explain the principles of the invention, the practical application, and to enable others of ordinary skill in the art to understand the invention for various embodiments with various modifications as are suited to the particular use contemplated.

What is claimed is:

1. A pipe coupling support for supporting an installed pipe coupling, the installed pipe coupling connecting a first pipe having a first exterior diameter and a second pipe having a second exterior diameter different from the first exterior diameter, the installed pipe coupling including a pliable body having a first portion receiving the first pipe, a second portion receiving the second pipe, and at least one clamping apparatus securing the pliable body to the first pipe and the second pipe, the pipe coupling support comprising:
   a circumferentially uninterrupted rigid body comprising a U-shaped cross-section, the circumferentially uninterrupted rigid body further comprising:
      a first opening having a first size, the first opening operable to receive the first pipe with the first exterior diameter;
      a second opening having a second size such that the second opening is operable to receive the second portion of the installed pipe coupling when the second pipe with the second exterior diameter is inserted in to the pliable body of the installed pipe coupler, wherein a first portion of the circumferentially uninterrupted rigid body forming the first opening and a second portion of the circumferentially uninterrupted body forming the second opening are connected to form the U-shaped cross-section, and
   wherein the pipe coupling support further comprises a recess in the circumferentially uninterrupted rigid body positioned to receive a protruding structure from the installed pipe coupling.

2. The pipe coupling support of claim 1, wherein the clamping apparatus further comprises a first hose clamp comprising a first worm drive bolt, the first hose clamp compressing a first portion of the pliable body against the first exterior diameter of the first pipe and the circumferentially uninterrupted rigid body of the pipe coupling support covers the first portion of the pliable body, the first hose clamp and first worm drive bolt when the pipe coupler support is installed on the installed pipe coupling.

3. The pipe coupling support of claim 2, wherein the clamping apparatus comprises a second hose clamp comprising a second worm drive bold, the second hose clamp compressing a second portion of the pliable body against the second exterior diameter and the recess is shaped to receive the worm drive bolt when the pipe coupling support is installed on the installed pipe coupling.

4. The pipe coupling support of claim 3, wherein the circumferentially uninterrupted rigid body of the pipe coupling support covers the first portion and the second portion of the pliable body when the pipe coupling support is fitted on the installed pipe coupling.

5. The pipe coupling support of claim 2, wherein the first opening and the second opening are concentric openings, thereby aligning the centers of the first pipe and the second pipe when the pipe coupling support is installed.

6. The pipe coupling support of claim 1, wherein when the pipe coupling support is fitted on the installed pipe coupling, the pipe coupling support prevents the pliable body from flexing by stabilizing the first pipe and the second pipe with the circumferentially uninterrupted rigid body, the first pipe being stabilized through direct contact with the circumferentially uninterrupted rigid body and the second pipe being stabilized through the circumferentially uninterrupted rigid body's contact with the second portion of the installed pipe coupling.

7. The pipe coupling support of claim 1, wherein the circumferentially uninterrupted rigid body is fabricated from one of:
   plastic,
   metal,
   concrete, and
   ceramic material.

8. The pipe coupling support of claim 1, wherein the circumferentially uninterrupted rigid body of the pipe coupling support covers substantially all of the installed pipe coupling.

9. A pipe coupling support for supporting an installed pipe coupling, the installed pipe coupling connecting a first pipe having a first exterior diameter and a second pipe having a second exterior diameter different from the first exterior diameter, the installed pipe coupling including a pliable body having a first portion receiving the first pipe, a second portion receiving the second pipe, and at least one clamping apparatus securing the pliable body to the first pipe and the second pipe, the pipe coupling support comprising:
   a circumferentially uninterrupted rigid body comprising a U-shaped cross-section operable to enclose the installed pipe coupling, the circumferentially uninterrupted body further comprising:
      a first opening having a first size, the first opening operable to receive the first pipe with the first exterior diameter; and
      a second opening having a second size such that the second opening is operable to receive the second portion of the installed pipe coupling when the second pipe with the second exterior diameter is inserted in to the pliable body of the installed pipe coupler; and
      at least one recess configured to receive a protruding structure associated with the installed pipe coupling.

10. The pipe coupling support of claim 9, wherein the at least one recess in the circumferentially uninterrupted rigid body is positioned to receive a protruding structure from the installed pipe coupling.

11. The pipe coupling support of claim 10, wherein the clamping apparatus comprises a first hose clamp comprising a first worm drive bold, the first hose clamp compressing a first portion of the pliable body against the first exterior diameter and the recess is shaped to receive the worm drive bolt when the pipe coupling support is installed on the installed pipe coupling.

12. The pipe coupling support of claim 9, wherein the circumferentially uninterrupted rigid body of the pipe coupling support covers substantially all of the installed pipe coupling.

13. The pipe coupling support of claim 9, wherein the circumferentially uninterrupted rigid body of the pipe coupling support is tapered.

14. A method of supporting a pipe coupling installed on pipe comprising:
   providing a pipe coupling support having a rigid body with an inner surface formed to mate with an exterior surface of the installed pipe coupling, the pipe coupling support comprising:
      a circumferentially uninterrupted body comprising a U-shaped cross-section, the circumferentially uninterrupted rigid body further comprising:
         a first opening having a first size, the first opening operable to receive the first pipe with the first exterior diameter; and
         a second opening having a second size such that the second opening is operable to receive the second portion of the installed pipe coupling when the second pipe with the second exterior diameter is inserted into the pliable body of the installed pipe coupler;
   associating the pipe coupling support with the installed pipe coupling such that the inner surface of the body is closely engaged with the exterior surface of the installed pipe coupling; and
   receiving a protruding structure associated with the installed pipe coupling within the one or more recesses associated in the circumferentially uninterrupted rigid body.

* * * * *